Patented Apr. 17, 1923.

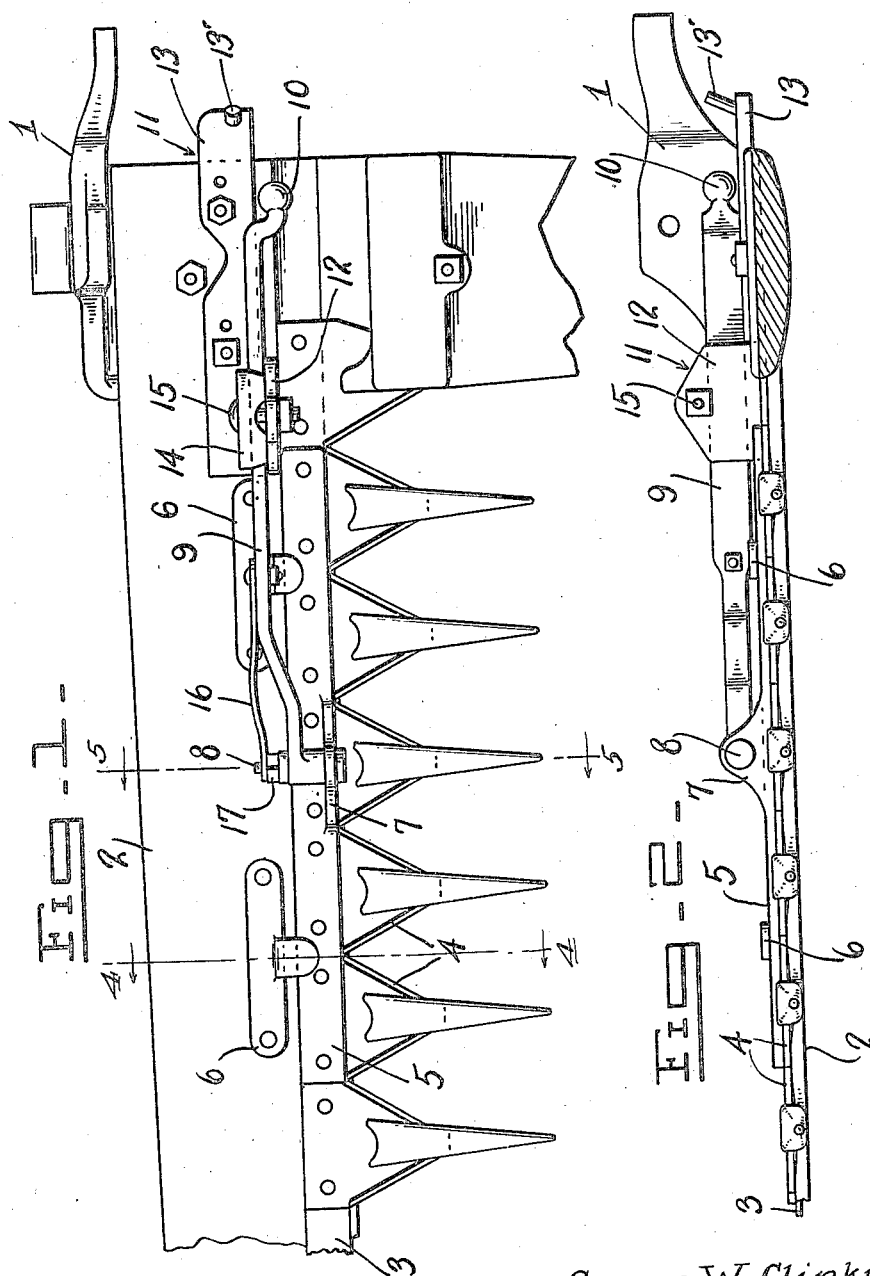

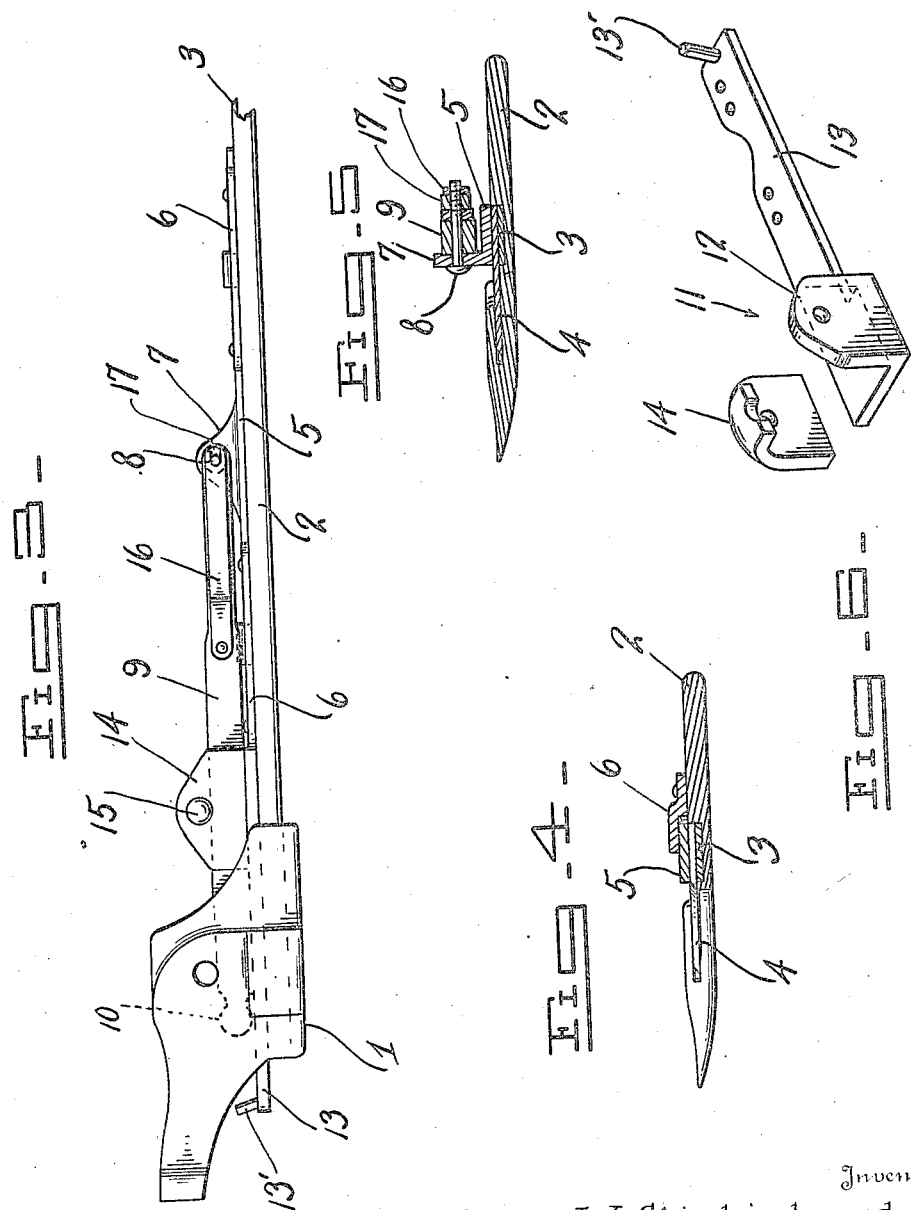

1,451,680

UNITED STATES PATENT OFFICE.

GEORGE W. CLINKINBEARD, OF ST. JOSEPH, MISSOURI.

ATTACHMENT FOR MOWING-MACHINE SICKLE BARS.

Application filed September 30, 1921. Serial No. 504,287.

*To all whom it may concern:*

Be it known that I, GEORGE W. CLINKINBEARD, a citizen of the United States, residing at St. Joseph, in the county of Buchanan and State of Missouri, have invented certain new and useful Improvements in Attachments for Mowing-Machine Sickle Bars, of which the following is a specification.

This invention relates to an attachment for mowing machines, the general object of the invention being to provide means for connecting the pitman with the knife head or cutter bar so as to strengthen the parts to reduce the danger of breakage at this point.

Another object of the invention is to provide means whereby the attachment may be removed and replaced by a new one very easily and quickly if it should happen to break.

The invention includes a plate adapted to be connected with the knife in such a manner that it can easily be removed and replaced by a new one, if it should happen to break and a guided member having one end pivotally connected with the plate and its other end adapted to be connected with the pitman.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view showing a part of a mowing machine with my invention thereon.

Figure 2 is a front view of Figure 1.

Figure 3 is a rear view thereof.

Figure 4 is a section on line 4—4 of Figure 1.

Figure 5 is a section on line 5—5 of Figure 1.

Figure 6 is a detail view.

In these views 1 indicates a part of a mowing machine and 2 the finger bar which is pivotally attached to the machine so that it can be raised and lowered in the ordinary manner. 3 indicates the knife bar carrying the knives 4.

As is well known, the connection between the knife head or cutter bar and pitman often breaks or separates and it is the object of the invention to provide means for strengthening these parts so as to reduce the danger of breakage and to make repairs easy if they should break.

In carrying out my invention I secure a plate 5 to the knife head or cutter bar by rivets or bolts and I secure guides 6 to the finger bar for engaging said plate. This plate carries an upright flange 7 which is perforated to receive a bolt 8. This bolt passes through an eye formed at the end of a member 9 forming a sliding link and which has its outer end of ball-shape, as shown at 10, for reception in the usual pitman socket (not shown) so that the reciprocation of the pitman will be communicated to the knife. The member 9 is of the shape shown so that the parts will move with the least amount of friction and said member 9 is guided in its movement by the guide 11 which is formed from a flange 12 on a plate 13 which is bolted to the finger bar and an angle bracket 14 which is bolted to the flange by the bolt 15. A flat spring 16 has one end bolted to the member 9 and its other end engaging said bolt 8 for locking the nuts 17 to the bolt and thus prevent the parts from working loose.

It will be thus seen that the connection between the knife head or cutter bar and pitman is greatly strengthened so as to reduce breakage at this point to the minimum and also to render the parts easily replaceable if they should happen to break. The invention also reduces friction of the moving parts of the connection.

Plate 13 carries a pin 13′ for limiting the inward movement of the reciprocating member 9.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a mowing machine, a finger bar, a cutter bar reciprocable longitudinally of the finger bar, a plate fixed on the cutter bar and having an upstanding flange formed thereon, a reciprocating link fixed to said flange, a guide plate mounted on the finger bar and having an upstanding flange against which the reciprocating link bears, and an angle bracket secured to the last mentioned flange and holding the reciprocating link for sliding movement against said flange, and means on the end of the link for connection to a pitman.

2. In a mowing machine, a finger bar, a cutter bar mounted for reciprocation longitudinally of the finger bar, a reinforcing plate fixed to the cutter bar and having a flange extending upward from one of its edges, a pivot pin passing through said flange, a guide plate fixed on the finger bar and provided with a bracket formed with angularly disposed legs, one of which is adapted to rest against the last-mentioned flange and the other against the guide plate, a flat reciprocating link mounted for longitudinal sliding movement between the angle plate and the last mentioned flange, said link having one end received on the pivot pin, means to hold the link on said pivot pin, and means at the other end of the link for connection to a pitman.

In testimony whereof I affix my signature.

GEORGE W. CLINKINBEARD.